May 22, 1962
M. C. TROYER
3,035,367
ANIMATED FISH LURE
Filed Dec. 3, 1956
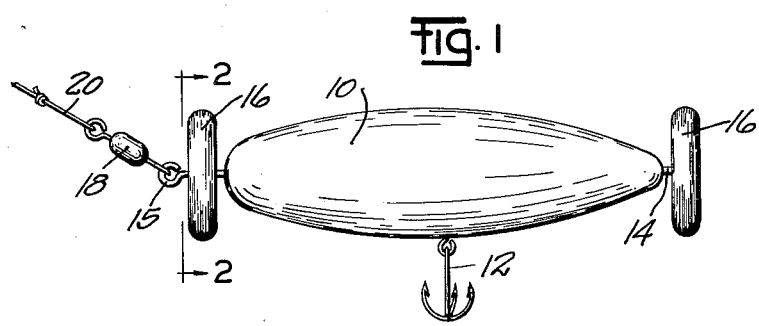
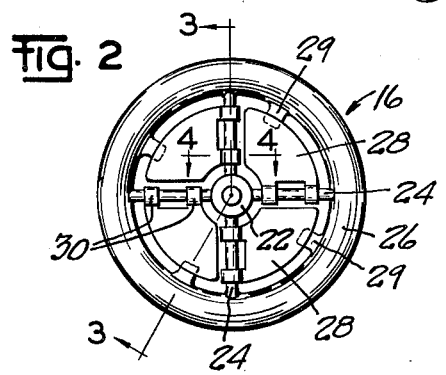
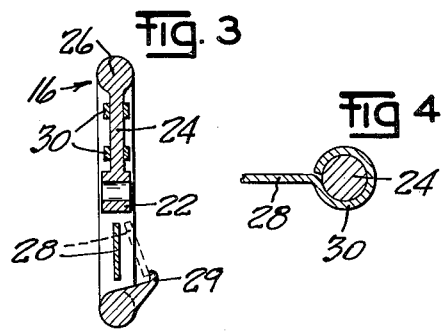
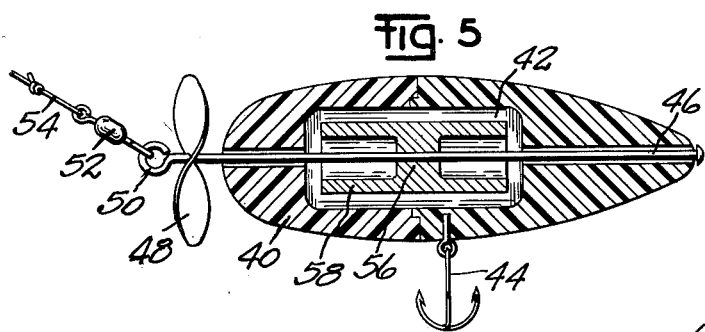
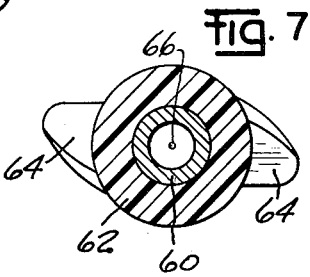
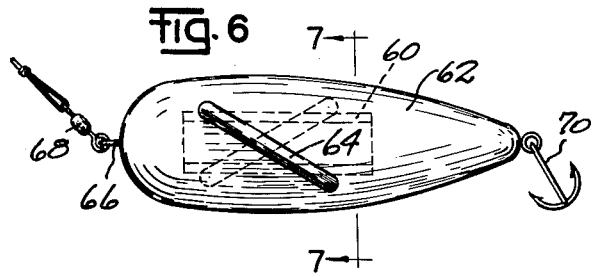
INVENTOR.
MILO C. TROYER.
BY
Eugene P. Knoblock
ATTORNEY

United States Patent Office 3,035,367
Patented May 22, 1962

1

3,035,367
ANIMATED FISH LURE
Milo C. Troyer, % H. & T. Manufacturing Co.,
Albion, Ind.
Filed Dec. 3, 1956, Ser. No. 625,987
2 Claims. (Cl. 43—42.16)

This invention relates to artificial fishing lures, and more particularly to an animated fishing lure.

The primary object of this invention is to provide a device in which the parts are so constructed and arranged that a moving part thereof reacts with the water as the lure is drawn through the water and actuates means for storing energy which is released when energy-generating tension upon the lure is released, so as to cause a further animation or movement of the lure to occur incident to the release of the stored energy.

A further object is to provide a device of this character having a weighty rotatable member responding to movement of the lure through the water, and whose movement continues by inertia after pull upon the lure is released, so that animation of the lure occurs incident to the release of the kinetic stored energy.

Other objects will be apparent from the following specification.

In the drawing:

FIG. 1 is a side view of a lure of the type embodying this invention;

FIG. 2 is an end view of the rotor employed in the lure illustrated in FIG. 1;

FIG. 3 is a sectional view taken on line 3—3 of FIG. 2;

FIG. 4 is a fragmentary sectional view taken on line 4—4 of FIG. 2;

FIG. 5 is a longitudinal sectional view of a modified embodiment of the lure;

FIG. 6 is a side view of another modified embodiment; and

FIG. 7 is a transverse sectional view taken on line 7—7 of FIG. 6.

Referring to the drawing, and particularly to FIG. 1 which illustrates one embodiment of the invention, the numeral 10 designates a lure body of any desired size, shape, configuration and material, which is provided with one or more fish hooks 12. The body 10 carries a longitudinal member 14, such as the shank of an eyelet 15, projecting at opposite ends thereof, upon which is rotated one or more reaction members 16, preferably of the gyroscopic type. The front attachment member or eyelet 15 will preferably have a swivel 18 connected thereto which provides means for attachment of a line 20.

The water reaction members 16 each have hubs 22 journaled upon the part 14. Spoke members 24 extend from hub 22 and carry an annular member 26 of substantial mass. Vanes 28 are carried by the spokes 24 and are adapted to react with the water while positioned at an angle to member 26 to define a propeller whereby to rotate the member 26 when the lure is drawn through the water. The vanes 28 may be fixed upon the spokes 24 but preferably are pivoted thereto at 30 for limited movement with respect to at least one of the members 16, i.e. between positions in the plane of the member 26 and angular positions engaging stops 29, respectively.

In the use of the device shown in FIG. 1, a pull upon the line will cause rotation of the members 16 relative to the lure. One of these members may rotate in one direction, and the other rotate in the opposite direction. Alternatively, only one member 16 may be provided if that is desired, but in this case it is preferable that it be of a construction whose vanes 28 are fixedly positioned in a helical or propeller-defining arrangement. The pull of the lure through the water will result in rotation of

2 the member or members 16 due to the propeller action of the vanes. Upon cessation or relaxation of pull, the inertia of the member 26 resulting from its mass will cause continued rotation of each of the members 16 used on the lure. In the case where one of the members 16 has its vanes 28 pivoted, the relaxation of tension upon the line, accompanied by the continued rotation of the member 26, will permit the vanes 28 to swing to a position substantially normal to the plane of the member 26 so that water reactance of the vanes 28 is reduced to a minimum. Where member 16 has stationary vanes, continued rotation after relaxation of line tension will produce a continued reactance with the water, as to agitate the water or propel the lure. It will also be understood that where two or more members 16 are provided, they may have propeller blades pitched in the same direction or in opposite directions and the blades of each may be stationary or pivoted as desired.

The continued rotation of the annular member 26 after pull upon the lure has been relaxed assures at least some agitation of the lure in each arrangement discussed above. In cases where the pitch of the propeller blades of at least one of the members 16 is fixed, the continued rotation of that member 16 will produce movement of the lure in the water after pull upon the line has ended. This movement may be in the same direction in which the pull had previously been exerted, or may be in a direction opposite that in which the pull had been exerted, depending upon the pitch of the propeller blade. In consequence, a wide variety of actions of the lure can be produced, depending upon the particular arrangement of the parts selected, with the result that manipulation of the lure by simple repeated pulls upon the line may produce different types of agitation of the lure and movement of the lure within the range suggested above.

FIG. 5 illustrates another embodiment of the invention wherein a hollow lure body 40 has a central cavity 42 and mounts the usual fish hooks 44. In the construction shown in FIG. 5 a wire or shaft 46 extends lengthwise of the body 40 and is journaled in openings extending therethrough. A water reactance member or propeller 48 is mounted upon the member 46 externally of the body 40. An eyelet 50 at the leading end of the lure is formed on the member 46 and has connection through a swivel 52 with a fish line 54.

A weight member is fixed to the shaft 46 and fits with clearance within a cavity 42. In the form here shown the weight member constitutes a hub 56 and an annular portion 58.

It will be apparent that a pull upon the line 54 in this construction will cause the propeller 48 to rotate upon reaction with the water to rotate the shaft 46 and the weight member 56, 58. When pull upon the line 54 ends or is relaxed, the inertia of the weight members 56, 58 will produce continued rotation thereof and of the propeller 48, thereby causing agitation of the water around the lure and movement of the lure as long as rotation of the member 58 continues.

In the embodiment of the invention shown in FIGS. 6 and 7, the annular weight member 60 is fixed within the cavity of a hollow body 62 which is provided with laterally projecting helical water reactance vanes or blades 64. A shaft 66 is journaled to extend through the body and will be provided at one end with swiveled line-attachment means 68 and at the other end with means for mounting a hook 70 in the manner well understood in the art. In such an arrangement the body 62 will be caused to rotate by the reaction of the blades 64 with the water incident to a pull upon the line, and, upon cessation or relaxation of the pull, the inertia of the annular weight member 60 will cause the body to continue to rotate until the force of inertia has been expended.

Each of the embodiments of this invention herein shown rely upon the development of energy of rotation through reaction with the water upon exertion of a pull on the lure, the storing of that energy by rotary action, namely, in the form of kinetic energy due to the inertia of a mass of substantial magnitude, and the release of that stored energy with incident movement of all or a part of the lure in a manner to produce agitation of the water with or without movement of the lure.

While various embodiments of the invention have been illustrated herein, it will be understood that changes in the construction within the scope of the appended claims may be made without departing from the spirit of the invention.

I claim:

1. A fishing lure comprising a body having a part projecting longitudinally therefrom, weighted means journaled on said projecting part and rotatably reacting with water when pulled through water, said weighted means including a member having a hub, a plurality of spokes, an annular weight member carried by said spokes concentric with said hub, and water reactance blades carried by said spokes and each having a water reactance position at an angle to the plane of said annular member, said weighted means continuing rotation after pull on said body is relaxed.

2. A fishing lure comprising a body having a part projecting longitudinally therefrom and weighted means journaled on said projecting part and rotatably reacting with water when pulled through water, said weighted means including a member having a hub, a plurality of spokes, an annular weight member carried by said spokes concentric with said hub, and water reactance blades carried by said spokes and each having a water reactance position at an angle to the plane of said annular member, said blades being pivoted to said spokes and means for limiting pivoting of said blades in water reactance position, said weighted means continuing rotation after pull on said body is relaxed.

References Cited in the file of this patent

UNITED STATES PATENTS

| | | |
|---|---|---|
| 804,972 | Pioch | Nov. 21, 1905 |
| 1,062,980 | Lewis | May 27, 1913 |
| 1,138,401 | Olmsted | May 4, 1915 |
| 1,495,927 | Roland | May 27, 1924 |
| 1,598,958 | Crosby | Sept. 7, 1926 |
| 1,907,815 | Hough | May 9, 1933 |
| 2,078,816 | Shenitz | Apr. 27, 1937 |
| 2,554,342 | O'Callaghan | May 22, 1951 |
| 2,597,982 | Fitzgerald | May 27, 1952 |

FOREIGN PATENTS

| | | |
|---|---|---|
| 729,629 | Great Britain | May 11, 1955 |